(12) United States Patent
Visser

(10) Patent No.: US 9,241,476 B2
(45) Date of Patent: Jan. 26, 2016

(54) METHOD FOR PREPARING AN INVASIVE TEST OF AN EGG AND FOR DETERMINING A GENDER OF AN EMBRYO IN AN EGG

(75) Inventor: Cornelis Frans Taco Visser, 's-Gravendeel (NL)

(73) Assignee: VISSER 'S-GRAVENDEEL HOLDING B.V., 's-Gravendeel (NL)

( * ) Notice: Subject to any disclaimer, the term of this patent is extended or adjusted under 35 U.S.C. 154(b) by 821 days.

(21) Appl. No.: 13/393,166

(22) PCT Filed: Sep. 2, 2010

(86) PCT No.: PCT/NL2010/000126
§ 371 (c)(1),
(2), (4) Date: May 4, 2012

(87) PCT Pub. No.: WO2011/028099
PCT Pub. Date: Mar. 10, 2011

(65) Prior Publication Data
US 2012/0231487 A1    Sep. 13, 2012

(30) Foreign Application Priority Data

Sep. 2, 2009 (EP) ........................................ 2003422

(51) Int. Cl.
*A61K 49/00* (2006.01)
*A01K 45/00* (2006.01)

(52) U.S. Cl.
CPC .................................... *A01K 45/007* (2013.01)

(58) Field of Classification Search
CPC . A01K 45/00; A01K 45/007; A61K 2123/00; A61K 2121/00
USPC ............. 424/1.11, 1.65, 9.1, 9.2, 9.6; 435/29, 435/349
See application file for complete search history.

(56) References Cited

U.S. PATENT DOCUMENTS

| 5,285,750 A | * | 2/1994 | Molian et al. ................. 119/174 |
| 5,339,766 A | | 8/1994 | Phelps et al. |
| 5,438,954 A | * | 8/1995 | Phelps et al. ................... 119/6.8 |
| 5,784,992 A | * | 7/1998 | Petitte et al. ................... 119/6.8 |
| 7,261,053 B2 | † | 8/2007 | Karaca |
| 2005/0263079 A1 | | 12/2005 | Karaca et al. |

FOREIGN PATENT DOCUMENTS

WO    2006/028553    3/2006

OTHER PUBLICATIONS

Lipar et al (1999), General and Comparative Endocrinology, vol. 115, pp. 220-227.*
Hackl et al (2003), J. Comp. Physiol. B, vol. 173, pp. 327-331.*

* cited by examiner
† cited by third party

*Primary Examiner* — D L Jones
(74) *Attorney, Agent, or Firm* — Bret E. Field; Bozicevic, Field & Francis LLP

(57) ABSTRACT

The present invention relates to a method for preparing an invasive test on an egg, such as determining the gender of an embryo in an egg, comprising the step of: providing a passage to the interior of an egg. The present invention also relates to a method for determining the gender of an embryo in an egg.

13 Claims, 1 Drawing Sheet

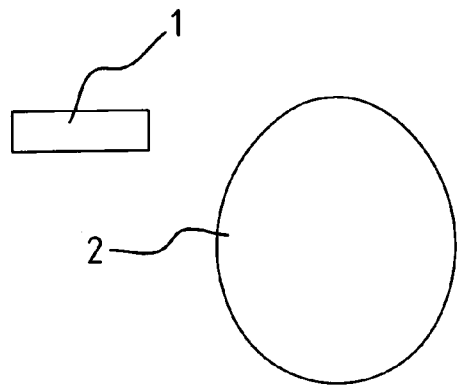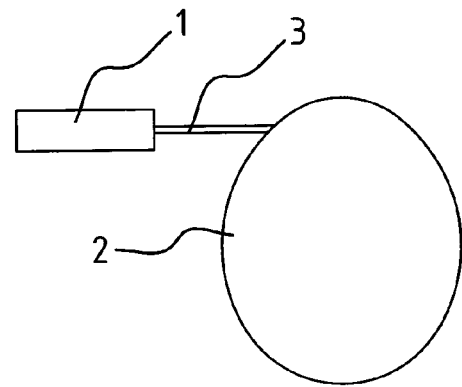
FIG. 1  FIG. 2
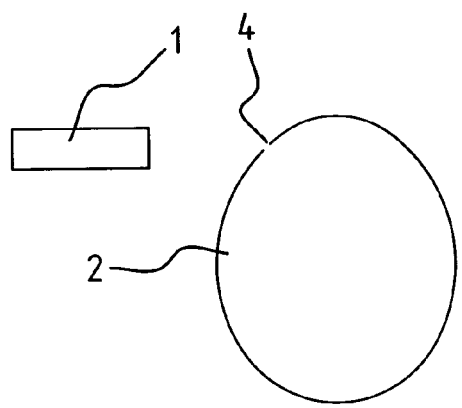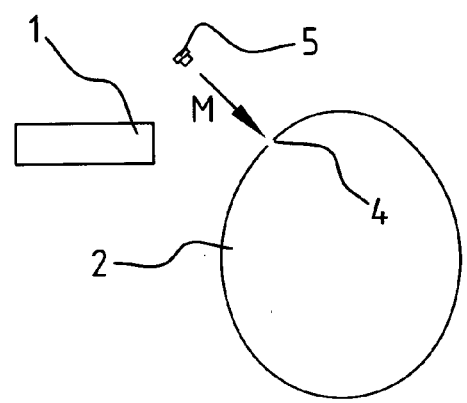
FIG. 3  FIG. 4
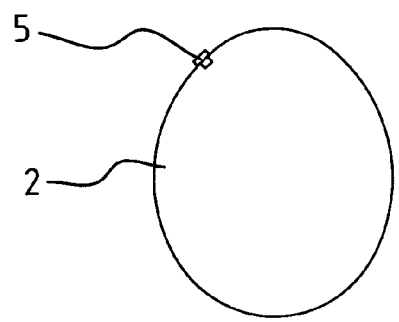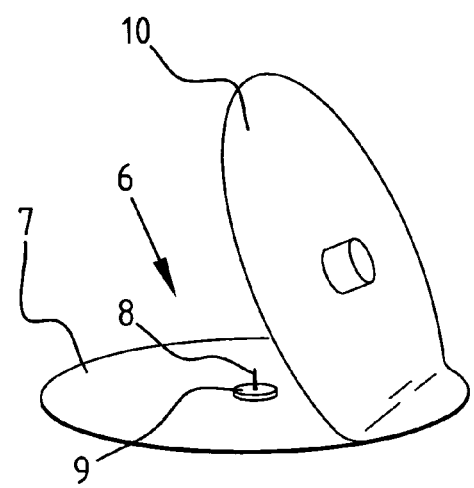
FIG. 5  FIG. 6

METHOD FOR PREPARING AN INVASIVE TEST OF AN EGG AND FOR DETERMINING A GENDER OF AN EMBRYO IN AN EGG

The present invention relates to a method for preparing an invasive test on an egg, such as determining the gender of an embryo in an egg, comprising the steps of:

providing a passage to the interior of an egg.

The present invention also relates to a method for determining the gender of an embryo in an egg.

Such a method is known from U.S. Pat. No. 6,510,811, in which an opening is made in the eggshell. A needle is inserted through this opening into the interior of the egg so that a sample can be taken or a fluid can be injected. The sample can be used, among other purposes, to determine the gender of an embryo in the egg. A drawback of this technique is that a needle is inserted into the interior of the egg, which can result in cross-infection. Another drawback is that the result of injecting a fluid is not visible from outside or that a link of the result of the sample to the associated egg is necessary, so an additional operation must be carried out for this purpose. Yet another drawback of the known method is that moisture can evaporate from an egg, with the result that an embryo in an egg will die.

BRIEF SUMMARY OF THE INVENTION

The present invention has for its object to obviate or at least reduce the prior art drawbacks, for which purpose a method is applied according to the invention as defined in the appended claims, in particular the independent claims.

By applying a method according to the invention, with the feature distinguishing it from the prior art that it comprises the steps of providing a sealing means for sealing the passage and arranging the sealing means in and/or on the passage, the method is improved considerably. The sealing means arranged in and/or on the passage makes it impossible, or at least much more difficult, for the fluid in the egg to flow out of the egg. A result hereof is that the interior of the egg will not dry out, and the embryo in the egg will not therefore die of dehydration. This is an improvement compared to the prior art.

The invention has diverse preferred embodiments which are defined in the dependent claims and/or will become apparent from the following description of several of such embodiments. The advantages and the inventive features of the invention in all its aspects, including the measures defined in the dependent claims, are in no way limited to the considerations stated above and/or below.

An embodiment of the method according to the invention has the feature that it further comprises of providing the sealing means in the form of a plug or a sticker in the form of a plaster. Both forms of the sealing means have advantages. The sealing means in the form of a plug thus has the advantage of tight sealing of the passage. In the form of a sticker in the form of a plaster an advantage is that the sealing means can be removed in relatively simple manner so that it is possible to reuse the same passage at a later stage if desired.

It is advantageous here that the method further comprises of manufacturing the sealing means from a quick-drying material. An advantage hereof is that the sealing means hardens relatively quickly after being arranged, whereby there is less chance of the fluid in the egg flowing out of the egg, and it is also impossible for substances to enter the egg from outside. A result is that the egg remains in better condition.

A further embodiment of the method according to the invention has the feature that it further comprises of manufacturing the sealing means at least partially from a biomarker and the remaining part from a quick-drying material. A biomarker is defined as a measuring instrument for a dose of one, or more than one, chemical or biological substance dissolved in a fluid of the egg. The reaction can give an indication of the result of the test which is being prepared.

It is further possible for the method to also comprise of manufacturing the sealing material substantially from a biomarker. A reason for this can be that a biomarker reacts minimally to a determined substance so that a larger quantity of biomarker is necessary in order to detect the reaction. Another reason can be that a determined quantity of biomarker is required in order to obtain a reaction. This depends on the biomarker and the substance whose presence is to be demonstrated in the fluid of the egg.

It is advantageous here that the method further comprises of providing the quick-drying material in the form of a monolith. A monolith is a single piece of porous material without large empty spaces. A monolith further has a number of properties, whereby it is highly suitable for antibody immobilization/interception, which can be very useful in this application. The feature that a monolith is formed from a porous material can also be used. When the sealing means is placed in and/or on the passage, fluid will flow out of the egg to the plug and into the sealing means due to the capillary action. One substance, or more than one substance, can here enter into a reaction with a biomarker which can be present in the sealing means.

It is advantageous here that the method further comprises of providing the passage which forms a connection between the allantoic fluid of the egg and the sealing means. The allantoic fluid of the egg contains much information about the condition of the egg. Information which can be gained from the allantoic fluid of the egg is for instance whether there is a virus in the egg or what the gender of the embryo in the egg is. By providing access to the allantoic fluid of the egg a wide range of information important for the condition of an egg can be checked. This therefore avoids a passage having to be made in an egg a number of times.

Yet another embodiment according to the invention has the feature that the method further comprises the steps of allowing the sealing means to react to the allantoic fluid of the egg and of assessing the reaction of the sealing means to the allantoic fluid of the egg, wherein the intensity of the reaction is a measure for the concentration of a chemical or biological substance in the allantoic fluid of the egg, and a result is linked to the intensity of the reaction. The result of the desired test becomes known by carrying out this step, and action can then be taken on the basis of this result. An advantage of this method is that the result of a test is linked to the associated egg, and a great deal of time is thereby saved. No further operations are after all required to register which sample belongs to which egg, it is not necessary to link the result to the associated egg and the result of the test can moreover be determined on the outside of the egg. In an environment where many eggs are tested it can be important to test as many eggs as possible as quickly as possible.

It is further possible that the method further comprises of allowing the sealing means to react to the substance in the interior of an egg which gives an indication of a gender. In a determined situation it may be desirable to know the gender of an embryo in an egg. In some fields of application male embryos are for instance undesirable. By making the sealing means sensitive to a gender-related hormone the gender of an embryo can be determined before the egg hatches. A result hereof is that eggs with embryos of a determined gender can be separated or removed from the process.

It is advantageous here for the method to further comprise of allowing the sealing means to react to the substance in the allantoic fluid of the egg which is one of the group comprising oestrogen and testosterone. An advantage of making the sealing means sensitive to oestrogen is that much is already known about the use of oestrogen. In respect of determining the gender of an embryo in an egg, research has already been carried out into demonstrating the presence of oestrogen in a fluid and the significance of a determined concentration of oestrogen. A result hereof is that the method is reliable. The above stated advantages in respect of oestrogen also apply to testosterone.

It is further possible for the method to further comprise the step of providing the egg, which is a chicken egg, prior to providing the passage. There is a great demand in the poultry industry for the testing of the condition of an egg or the gender of an embryo in an egg. Many eggs are tested daily and, if a good and reliable method exists, a great deal of time, and ultimately money, can then be saved. In some fields of application eggs with a male embryo therein are undesirable and only take up space. Space can likewise be saved by testing for the gender of an embryo in an egg.

A further embodiment according to the invention has the feature that the method further comprises the step of waiting between 13 and 17 days after conception before providing the passage. Good results have been achieved in the past in determining the gender of an embryo during this time period. The conditions in an incubator during this period of time are also favourable for the capillary action from the egg to the sealing means. An additional advantage hereof is that no components of the sealing means or reagents diffuse in the sealing means in the egg.

It is further possible for the method to further comprise of providing the passage using a laser. Through the use of a laser to provide a passage there is no direct contact with the outside and inside of the egg. The result hereof is that cross-infection is made impossible, or can at least be more readily prevented. Fewer eggs will therefore be lost during the whole process due to disease or the like. The laser will preferably be directed toward the side of the egg which is oriented upward. This is preferably the top or the bottom of the egg. A reason for this is that the allantoic fluid is situated under the air sac of the egg, which is displaced when the egg is rotated. An advantage hereof is that the allantoic fluid can be reached better than when the laser is directed toward the side of the egg, and there is less chance of the laser being incident upon the embryo. It is further recommended that a normal of the egg and the direction of the laser enclose an angle. This also reduces the chance of incidence upon the embryo in the egg. It is also important that access is provided to the allantoic fluid in the correct period of the incubation process. A good period is between 13 and 17 days after conception of the egg. After this period there is the risk of the allantoic fluid no longer being present.

As stated above, the present invention also relates to a method for determining the gender of an embryo in an egg, comprising the steps of providing a passage to allantoic fluid of an egg, providing a sealing means with a biomarker for sealing the passage, arranging the sealing means in and/or on the passage, allowing the sealing means to react to the allantoic fluid of the egg, and assessing the reaction of the sealing means to the allantoic fluid of the egg, wherein the reaction is an indication of the gender of the embryo in the egg. By applying the method in this manner it is relatively easy to determine the gender of the embryo in the egg, and the result of the test is linked to the egg. Because the result of the test is directly linked to the associated egg, fewer operations are required in the processing of eggs. Time, and ultimately money, can hereby be saved. An additional advantage of the reduced number of operations is that it is more advantageous for the industry to apply this method.

The invention further relates to an egg on which a sealing means is arranged according to the method as described above. An advantage of such an egg is that, when a test is performed on the egg, the result is always linked to the associated egg. The result hereof is that additional operations are precluded.

BRIEF DESCRIPTION OF DRAWINGS

Following hereinbelow is a description of several embodiments shown in the accompanying drawings, which are provided only by way of example and in which the same or similar parts, components and elements are designated with the same reference numerals, and in which:

FIG. 1 shows a schematic view of an egg at the beginning of the process;

FIG. 2 shows a schematic view of a passage being provided;

FIG. 3 shows a schematic view of the egg with passage;

FIG. 4 shows a schematic view of the sealing means;

FIG. 5 shows the egg after the final stage; and

FIG. 6 shows a plaster with a needle and a biomarker as possible realization of an embodiment of the method according to the present invention.

DETAILED DESCRIPTION

FIG. 1 shows an egg 2 before the start of the method as defined in the claims. In FIG. 1 a laser 1 is directed toward the side of egg 2. It is not necessary in practice for laser 1 to be directed toward a side of egg 2. Laser 1 can also be directed toward the top side, underside or any random position on egg 2. As already stated above, it is recommended to direct the laser toward the side of the egg which is oriented upward. This is preferably the top or bottom of the egg. It is also important that this be done during the correct period of the incubation process, since otherwise allantoic fluid will no longer be present in the egg. The position can depend on the test which is to be performed.

FIG. 2 shows the step of the method in which a passage is provided to the allantoic fluid of egg 2. Laser 1 is still directed toward egg 2 and is now operational. A laser beam 3 travels from laser 1 to the outer side of egg 2. A hole will be burned in the shell of egg 2 by the energy of laser beam 3. Laser beam 3 is switched off at the moment that laser beam 3 has passed through the shell, since there is otherwise the risk of damage to an embryo in the egg.

FIG. 3 shows an egg 2 after laser beam 3 has been switched off. A passage 4 is clearly visible in the shell of egg 2. Via this passage 4 it is possible to access the allantoic fluid of the egg. The size of passage 4 is shown schematically here. It can of course be modified to the purpose thereof, or to the sealing means 5 to be applied later.

FIG. 4 shows the step of the method as defined in the claims in which sealing means 5 is provided. In the figure the sealing means takes the form of a plug 5. Sealing means 5 is moved with a movement M toward the passage and placed therein. In practice however, the sealing means can also be arranged only on the outer surface of the egg.

FIG. 5 shows an egg 2 after all steps of the method as defined in the claims have been performed. Plug 5 is placed in passage 4 in the shell of egg 2 and is thereby closed off again. Owing to the capillary action from the interior of egg 2 to plug 5 fluid will flow out of egg 2 into plug 5. Here the fluid will enter into a reaction with the biomarker that is present, and this reaction will be detectable.

FIG. 6 shows a plaster 6. Plaster 6 comprises an adhesive or sticking element 7 with a needle 8 arranged thereon. A material 9 comprising a biomarker is arranged at the position of the location of needle 8. A protective layer 10 or film is arranged over the side of the adhesive or sticking element 7 with needle 8 and biomarker 9 in order to cover needle 8 and the biomarker until a time of use. Protective layer 10 can then be pulled off the adhesive or sticking element 7 in a manner usual for a plaster, and the element can then be adhered to the outer side of an egg. A user can press carefully on the centre of plaster 6 and thus cause needle 8 to penetrate into and through the shell of an egg so that the allantoic fluid then comes into contact with biomarker 9, and the gender of an embryo in the egg can be determined on the basis of the reaction or interaction of the biomarker to or with the allantoic fluid. In order to demonstrate this, material 9 can extend through the plaster from the shown side to the opposite side, or the adhesive or sticking element 7 can be manufactured from transparent material, or plaster 6 with biomarker 9 must temporarily be pulled off a tested egg in order to then see how the biomarker has reacted to or with the allantoic fluid in the egg (after which the plaster is or can be replaced in order to realize the function of the sealing means). It will be apparent that any combination of the adhesive or sticking element 7, needle 8 and biomarker 9 can be designated as "the sealing means" in the sense of the appended claims.

After examination of the foregoing, many alternative and additional embodiments will occur to the skilled person which all lie within the scope of the present invention as defined in the appended claims. Only when an embodiment differs in letter or spirit from the specific definitions of the scope of protection, particularly the independent claims, is it then no longer an embodiment according to the invention.

It is thus possible for a sensor to be arranged in the sealing means, for instance a temperature sensor, so that the temperature in the egg can be monitored. It is conceivable for the temperature to affect the development of an embryo. Another possibility is that the sealing means indicate the stage of the incubation process of the egg so that the conditions around the egg can be modified thereto. It is also noted that it is possible to arrange a pharmaceutical or vaccination in the sealing means. A substance can thus be administered during the whole incubation process in order to maintain or restore the good health of the embryo. It is further noted that all types of sealing means which can be used in combination with a biomarker, or a biomarker per se, lie within the scope of protection. Some examples are: a plug consisting entirely of a biomarker, a plug partially manufactured from a biomarker, a sticker incorporating a biomarker, a sticker on at least a part of one side of which a biomarker is arranged, and a sticker consisting entirely of a biomarker. A sealing means is also understood to mean other variants for sealing a passage in the shell of an egg. It is thus possible to envisage a biomarker first being placed in the passage and then being covered with a sticker or the like. A reaction of a biomarker can take different forms. It is thus possible for the biomarker to display fluorescence, although other types of exo-energetic reaction are also possible.

The invention claimed is:

1. A method for preparing an invasive test on an egg having a shell, the method comprising:
    generating a passage through the shell to allantoic fluid of an egg;
    sealing the passage by arranging a seal on the shell at an entrance of the passage, wherein the seal comprises a biomarker and an adhesive.

2. The method of claim 1, wherein the seal comprises a plug comprising plaster.

3. The method of claim 1, wherein the biomarker comprises a fluorescent biomarker.

4. The method of claim 1, further comprising the steps of:
    allowing a reaction to occur between the seal and the allantoic fluid of the egg; and
    assessing an intensity of the reaction, wherein the intensity of the reaction is a measure for the concentration of testosterone, oestrogen, or a combination thereof in the allantoic fluid of the egg.

5. The method of claim 4, wherein the reaction is in an interior of the egg shell.

6. The method of claim 1, wherein the egg is a chicken egg.

7. The method of claim 1, further comprising the step of:
    waiting between 13 and 17 days after conception before providing the passage.

8. The method of claim 1, further comprising of providing the passage using a laser by directing the laser toward a side of the egg and thereby burning the passage in the shell of the egg.

9. The method of claim 4, wherein assessing the reaction comprises determining a gender of an embryo in the egg.

10. The method of claim 1, wherein the invasive test is a test for determining a gender of an embryo in the egg.

11. The method of claim 4, further comprising determining a gender of an embryo in the egg based on the intensity of the reaction.

12. The method of claim 4, wherein the reaction is between the biomarker and testosterone, oestrogen, or a combination thereof.

13. The method of claim 1, wherein arranging the seal on the passage comprises arranging the seal in the passage.

* * * * *